(12) United States Patent
Abad et al.

(10) Patent No.: US 8,689,873 B2
(45) Date of Patent: Apr. 8, 2014

(54) COMPOSITIONS AND METHODS FOR IMPROVING THE TOUGHNESS OF SET CEMENTS

(75) Inventors: Carlos Abad, Richmond, TX (US); Hemant K. J. Ladva, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 217 days.

(21) Appl. No.: 13/283,556

(22) Filed: Oct. 27, 2011

(65) Prior Publication Data

US 2013/0105162 A1 May 2, 2013

(51) Int. Cl.
*E21B 33/13* (2006.01)

(52) U.S. Cl.
USPC .......................................... 166/295; 166/300

(58) Field of Classification Search
None
See application file for complete search history.

(56) References Cited

U.S. PATENT DOCUMENTS

| 5,875,844 | A | 3/1999 | Chatterji et al. |
|---|---|---|---|
| 6,098,711 | A | 8/2000 | Chatterji et al. |
| 6,234,251 | B1 | 5/2001 | Chatterji et al. |
| 6,244,344 | B1 | 6/2001 | Chatterji et al. |
| 6,271,181 | B1 | 8/2001 | Chatterji et al. |
| 6,330,917 | B2 | 12/2001 | Chatterji et al. |
| 6,350,309 | B2 | 2/2002 | Chatterji et al. |
| 6,401,817 | B1 | 6/2002 | Griffith et al. |
| 6,448,206 | B1 | 9/2002 | Griffith et al. |
| 6,503,870 | B2 | 1/2003 | Griffith et al. |
| 6,555,507 | B2 | 4/2003 | Chatterji et al. |
| 6,593,402 | B2 | 7/2003 | Chatterji et al. |
| 6,645,288 | B1 | 11/2003 | Dargaud et al. |
| 6,742,592 | B1 | 6/2004 | Le Roy-Delage et al. |
| 7,156,172 | B2 | 1/2007 | Becker et al. |
| 7,299,871 | B2 | 11/2007 | Hanes, Jr. |
| 7,762,329 | B1 | 7/2010 | Morgan et al. |
| 2004/0251026 | A1 | 12/2004 | Dargaud et al. |
| 2006/0183819 | A1 | 8/2006 | Le Roy-Delage et al. |
| 2007/0022915 | A1 | 2/2007 | Drochon et al. |
| 2012/0328377 | A1* | 12/2012 | Brenneis et al. .............. 405/267 |

FOREIGN PATENT DOCUMENTS

| EP | 1028096 | 8/2004 |
|---|---|---|
| WO | 2005085587 | 9/2005 |

OTHER PUBLICATIONS

Nelson EB, Drochon B, Michaux M and Griffin TJ: "Special Cement Systems," in Nelson EB and Guillot D (eds): Well Cementing—2nd Edition, Schlumberger, Houston (2006) 233-268.

* cited by examiner

*Primary Examiner* — Zakiya W Bates
(74) *Attorney, Agent, or Firm* — Michael Dae

(57) ABSTRACT

The toughness of set cement may be enhanced by incorporating partially cured waterborne resins in the cement matrix. A hardening agent is added to the waterborne resin, and the mixture is allowed to react for periods between about 1 min and 15 min. The waterborne resin with hardening agent is then combined with an inorganic cement to form a pumpable slurry.

17 Claims, 3 Drawing Sheets

COMPOSITIONS AND METHODS FOR IMPROVING THE TOUGHNESS OF SET CEMENTS

BACKGROUND

The statements in this section merely provide background information related to the present disclosure and may not constitute prior art.

This disclosure relates to methods for improving the toughness of zonal isolation materials.

Set cements that are tough are particularly desirable in the context of well cementing. In general, a well that is more than a few hundreds of meters deep is cased, and the annular space between the underground formation and the casing is cemented over all or part of its depth. The essential function of cementing is to prevent fluid exchange between the different formation layers through which the borehole passes and to control the entry of fluids into the well, in particular to limit the entry of water and gas. In production zones, the casing, the cement and the formation are all perforated, typically by the use of explosive perforating charges, over a few meters.

The cement positioned in the annular space in a well is subjected to a number of stresses throughout the well's lifetime. The pressure inside the casing can increase or decrease as the nature of the fluids therein changes, or when additional pressure is applied within—for example during a stimulation operation. Such pressure changes may cause the casing to expand or contract, thereby exerting stress on the cement sheath.

Temperature changes also exert stress on the casing, which in turn affects the cement sheath. Such temperature changes may arise owing to cement hydration and the pumping of fluids into the well whose temperatures are significantly different from those in the wellbore.

Mechanical shocks may be exerted by perforating operations. Perforating may not only causes an overpressure of several hundred bars inside the well, but the energy also dissipates in the form of a shock wave. Perforating also disturbs the cement when the charge penetrates the cement sheath and subjects the zone surrounding the borehole to large forces extending several meters into the formation.

Another process that creates dynamic stresses in the cement sheath is when a window is cut through a cemented casing to create a sidetrack. Milling the steel over a depth of several meters followed by drilling a sidetrack subjects the cement to shock and vibration, which may cause irreversible damage.

Over the course of a well's productive life, and after abandonment, seismic events may disturb the borehole and the cement sheath, potentially disrupting the cement sheath and causing the loss of zonal isolation.

The well cementing industry has responded to these challenges by developing cement systems with improved flexibility. Such cement systems may have lower densities than conventional cements, or they may contain fibers, flexible particles or both. They generally have lower Young's moduli than conventional cements. A review of these systems is presented, for example, in the following publication: Nelson E B, Drochon B, Michaux M and Griffin T J: "Special Cement Systems," in Nelson E B and Guillot D (eds): *Well Cementing—2nd Edition*, Schlumberger, Houston (2006) 233-268.

Despite the valuable contributions offered by these technologies, it would be desirable to have even more durable cement systems thereby ensuring that the cement sheath maintains zonal isolation during and after hydraulic fracturing operations.

SUMMARY

In an aspect, embodiments relate to methods for treating a subterranean well comprising: providing a first composition comprising a slurry comprising an inorganic cement; providing a second composition comprising a waterborne resin; adding a hardening agent to the second composition, and allowing the hardening agent to react with the resin; mixing the first composition with the second composition containing the hardening agent; and placing the resulting mixture in the well. The stoichiometric ratio—hardening agent:resin—is from about 0.25:1 to about 30:1, and the resin is present in the resulting mixture at a concentration between about 5% and about 95% by volume.

In a further aspect, embodiments relate to methods for improving zonal isolation in a subterranean well comprising: providing a first composition comprising a slurry comprising an inorganic cement; providing a second composition comprising a waterborne resin; adding a hardening agent to the second composition, and allowing the hardening agent to react with the resin; mixing the first composition with the second composition containing the hardening agent; and placing the resulting mixture in the well. The stoichiometric ratio—hardening agent:resin—is from about 0.25:1 to about 30:1, and the resin is present in the resulting mixture at a concentration between about 5% and about 95% by volume.

In yet a further aspect, embodiments relate to methods for formation consolidation comprising: providing a first composition comprising a slurry comprising an inorganic cement; providing a second composition comprising a waterborne resin; adding a hardening agent to the second composition, and allowing the hardening agent to react with the resin; mixing the first composition with the second composition containing the hardening agent; and injecting the resulting mixture in the formation. The stoichiometric ratio—hardening agent:resin—is from about 0.25:1 to about 30:1, and the resin is present in the resulting mixture at a concentration between about 5% and about 95% by volume.

DETAILED DESCRIPTION

Figure 1:
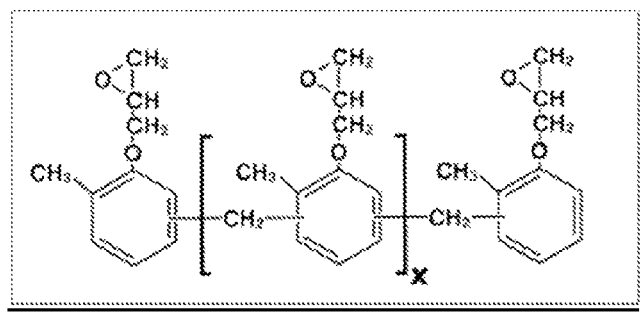
FIG. 1 shows the molecular structure of a commercially available epoxidized ortho-cresylic novalac resin—EPI-REZ 6006-W-68 from Momentive, Columbus, Ohio, USA.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments and should not be construed as a limitation to the scope and applicability of the disclosed embodiments. While the compositions of the present disclosure are described herein as comprising certain materials, it should be understood that the composition could optionally comprise two or more chemically different materials. In addition, the composition can also comprise some components other than the ones already cited.

For this disclosure, toughness will be defined as the ability of a material to absorb energy and plastically deform without fracturing. Thus, the higher the strain a material can withstand without breaking, the tougher it will be.

The Applicants have determined that set cements with improved toughness may be prepared by incorporating partially cured resins into aqueous-base inorganic cements. For the envisioned well-cementing applications, set cements that are able to withstand more than 1.5% deformation (or strain) before failing in a compression test are desired.

The compositions comprise an inorganic cement, a waterborne resin and a hardening agent. The compositions apply to all embodiments presented in this disclosure. The compositions are preferably pumpable. Those skilled in the art will recognize that, in the context of most oilfield operations, a pumpable composition preferably has a viscosity less than 1000 mPa-s at a shear rate of 100 s$^{-1}$.

The inorganic cement may comprise (but would not be limited to) Portland cement, calcium aluminate cement, fly ash, blast furnace slag, magnesium oxychloride, lime/silica blends, chemically bonded phosphate ceramics, or geopolymers, or combinations thereof.

The resin may comprise (but would not be limited to) epoxy resin, novolac resins, polyepoxide resins, phenol-aldehyde resins, urea-aldehyde resins, urethane resins, phenolic resins, furan resins, furan/furfuryl alcohol resins, bismaleimide resins, phenolic/latex resins, phenol formaldehyde resins, unsaturated polyester resins, polyester resins, hybrid polyester resins, polyester copolymer resins, polyurethane resins, hybrid polyurethane resins, polyurethane copolymer resins, acrylate resins, polyacrylic resins, alkyd resins, amino resins, polyimide resins, vinyl ester resins, cyanate esters, silicone resins, or epoxy vinyl resins, or combinations thereof. Of these, epoxy resins are preferred. Particularly preferred epoxy resins include (but are not limited to) bisphenol-A epoxy resin, aqueous dispersions of semi-solid bisphenol-A epoxy resin, aqueous dispersions of solid bisphenol-A epoxy resin, aqueous dispersions of bisphenol-A resin with an organic cosolvent, aqueous dispersions of bisphenol-A resin with a non-hazardous air pollutant (HAP) cosolvent, aqueous dispersions of bisphenol-A novolac resin with an average functionality of 3, aqueous dispersions of urethane modified epoxy resin with an average functionality between 2 and 3, waterborne dispersions of epoxidized ortho-cresylic novolac resin with an average epoxy functionality of 6, and water dispersible bisphenol-A epoxy resin. The resin may be a solid dispersion, a liquid dispersion, an emulsion, or a combination thereof. The initial resin particles or droplets size may be between about 50 nm and 1 mm. In addition, the amount of resin in the dispersion may vary from 5% to 95% by volume, and preferably from about 30% to 70% by volume. The dispersion may further comprise a surfactant.

The hardening agent may comprise (but would not be limited to) aliphatic amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, aminophenyl piperazine, imidazoline, 1,2-diaminocyclohexane, polytheramine, diethyltoluenediamine, diaminodiphenyl methane, methyltetrahydrophthalic anhydride, hexahydrophthalic anhydride, maleic anhydride, polyazelaic polyanhydride, or phthalic anhydride, or combinations thereof. Preferred hardening agents include (but would not be limited to) polyoxypropylenediamine, tris-(dimethylaminomethyl)phenol, blends of aliphatic amines and methoxy propanol, aqueous dispersions of an amine adduct, blends of water reducible amine adducts and 2-propoxyethanol, aliphatic amidoamine and polyamidoamine.

It has been determined that set cements with improved toughness are obtained with stoichometric ratios between the hardening agent and the resin that deviate from common practices in polymer-chemistry applications. The stoichiometric ratio between the hardening agent and the resin is preferably between about 0.25:1 and 30:1, more preferably between about 1.1:1 and 5:1, and most preferably between about 1.2:1 and 3:1. The stoichiometric ratio may be defined and exemplified by considering epoxy resins and amine hardening agents. One considers two quantities—the Amine Hydrogen Equivalent Weight (AHEW) for the hardening agent, and the Epoxide Equivalent Weight (EEW) for the epoxy resin. The AHEW is calculated by dividing the hardening agent molecular weight by the number of amine hydrogens. For example considering the following amine.

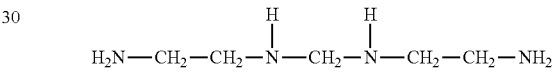

The molecular weight of the amine is 146. There are six amine hydrogens, giving the amine a "functionality" of 6. The AHEW is 146/6=24. The EEW for a particular epoxy resin is the number of grams of resin that contain one chemical equivalent of the epoxy group. Consider an epoxy resin with an EEW of 200. In order to cure 100 g of the resin with the amine shown above, 24×100/200=12 g of the amine would be required. This corresponds to a stoichiometric ratio of 1:1, which is typically considered by those skilled in the art of polymerization to be the optimum for achieving the desired molecular weight and properties. In addition, the resin concentration in the composition may be between about 5% and about 95% by volume, and more preferably between about 5% and about 50% by volume.

For all embodiments, the resin, the hardening agent or both may be encapsulated.

Modifiers may also be present, including (but not limited to) epoxy functionalized alcohols, diols, polyols, acids, monofunctional aliphatic glycidyl ethers, monofunctional aromatic glycidyl ethers, polyfunctional glycidyl ethers and polyfunctional flexibilizers made from polyols and acids and glycidyl ether.

The glass transition temperature (Tg) of the set resin may also be varied according to the cement properties.

The composition may further comprise a cement retarder comprising a lignosulfonate, a hydroxycarboxylic acid, a phosphonate, or a combination thereof. The Applicants have surprisingly discovered that incorporating retarders in the composition may further enhance toughness.

Particulate materials may also be incorporated in the composition, including (but not limited to) silica, hematite, barite, ilmenite, manganese tetraoxide, bauxite, magnesium oxide, polyethylene, unitaite, rubber, carbon fibers, cellulosic fibers, plastic fibers, glass fibers, metallic fibers, mineral fibers, para-aramid fibers, polyvinyl alcohol fibers, polylactic acid fibers, polyglycolic acid fibers, cured resin coated sand, or curable resin coated sand, or combinations thereof. The combination and particle size distribution of the particulate materials may be chosen to optimize the solid volume fraction of the composition.

Gas generating agents may also be incorporated into the composition.

In an aspect, embodiments relate to methods for treating a subterranean well.

A first composition is provided that comprises an inorganic cement. A second composition is provided that comprises a waterborne resin. A hardening agent is added to the second composition, and allowed to react with the resin for a time period between about 1 minute and 1 hour. The first and second compositions are then combined, resulting in the preparation of a slurry. The resulting slurry is then allowed to set.

In a further aspect, embodiments relate to methods for improving zonal isolation in a subterranean well. The methods employ the compositions described by the previously presented aspect of this disclosure.

A first composition is provided that comprises an inorganic cement. A second composition is provided that comprises a waterborne resin. A hardening agent is added to the second composition, and allowed to react with the resin for a time period between about 1 minute and 1 hour. The first and second compositions are then combined, resulting in the preparation of a slurry. The resulting slurry is then allowed to set.

In yet a further aspect, embodiments relate to methods for consolidating a subterranean formation. The methods employ the compositions described by a previously presented aspect of this disclosure.

A first composition is provided that comprises an inorganic cement. A second composition is provided that comprises a waterborne resin. A hardening agent is added to the second composition, and allowed to react with the resin for a time period between about 1 minute and 1 hour. The first and partially reacted second compositions are then combined, resulting in the preparation of a slurry. The resulting slurry is then placed in the well.

Those skilled in the art will recognize that the placement of the disclosed slurries may occur during primary cementing and/or remedial cementing. For primary cementing, it will also be recognized that the disclosed slurries may cover the entire annular region between a casing string and the formation (or another casing string), or only a portion thereof. Those skilled in the art will recognize that the term casing may comprise tubular structures that can be metallic, polymeric, coated or partially comprising other types of materials such as rubbers, polymers and resins. In the context of remedial cementing, the disclosed slurries may be used for setting plugs, squeeze cementing and formation consolidation. Squeeze cementing and formation consolidation operations involve placing the slurries outside of the wellbore and into perforations, leaks or the formation matrix itself.

Those skilled in the art will also realize that formation-consolidation treatments may take place not only during remedial cementing operations, but also during drilling and production.

EXAMPLES

The following examples serve to further illustrate the disclosure. Unless stated otherwise, the following resin and hardening agent were used in the following examples. The waterborne resin was EPI-REZ 6006-W-68, available from Momentive, Columbus, Ohio, USA. This product is an epoxidized ortho-cresylic novalac resin with an average functionality of six. The Epoxide Equivalent Weight (EEW) is 250. The molecular structure is shown in FIG.FIG. 1. The resin particle size is approximately 0.2-6.0 EPI-REZ 6006-W-68 contains 68 wt % resin and 32 wt % water.

Figure 2:
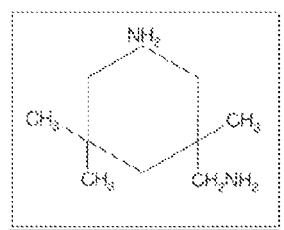
FIG. 2 shows the molecular structure of a commercially available cycloaliphatic amine—EPIKURE 3300 from Momentive, Columbus, Ohio, USA.

The hardening agent was EPIKURE 3300, also available from Momentive. This product is a cycloaliphatic amine, whose structure is shown in FIG.FIG. 2. The Amine Hydrogen Equivalent Weight (AHEW) is 42.6. Therefore, to achieve 1:1 stoichiometry between the resin and the hardening agent, one would add 17.04 g of EPIKURE 3300 to 100 g of resin. EPI-REZ 6006-W-68 contains 68% resin; therefore, one would use 147 g to have 100 g of active resin.

The resin/hardening agent mixtures were added to Class G Portland cement. The mixtures were cured in a 150° F. (65.6° C.) water bath for 24 hours. Then, cylindrical cores were fabricated from each sample. The dimensions were 1-in. (2.54-cm) diameter and 2-in. (5.08-cm) length. Stress-strain measurements on the cores were performed with an MTS load cell, available from MTS Systems Corporation, Eden Prairie, Minn., USA. Samples were preloaded to 50 lbf (4.45 N) for 5 sec, then load was applied at a rate of 4000 lbf/min (17.8 kN/min) until the cylinders crushed and the compressive strength fell to zero.

Example 1

Figure 3:
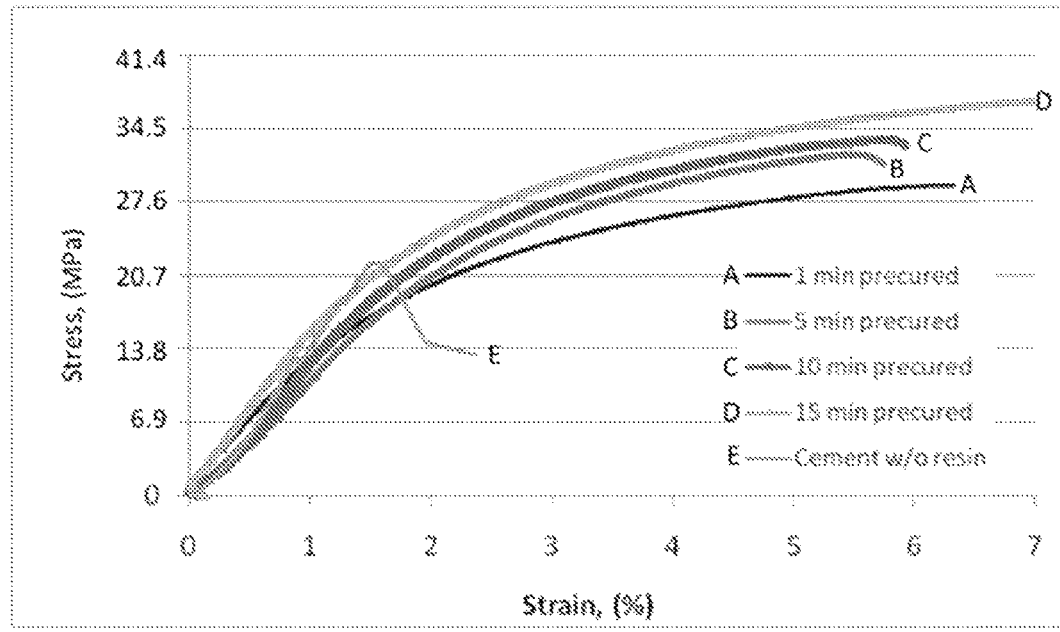
FIG. 3 shows the effect of resin addition on the ability of a cement system to withstand strain.

Waterborne resin and hardening agent were combined in a 1:1 stoichiometric ratio. The proportions were 43.75 g of EPI-REZ 6006-W-68 and 5.07 g of EPIKURE 3300. Mixtures were allowed to cure for various time periods 1 min, 5 min, 10 min and 15 min. After the curing periods, each mixture was added to 30 g of Class G Portland cement to form a slurry. After setting in the water bath for 24 hours, cylindrical cores were fabricated, taking care that the two ends were parallel, and underwent mechanical-property measurements. The results, presented in FIG.FIG. 3, show that, compared to cement without resin, resin addition significantly increases the strain the samples can withstand before failing. Performance improves with longer curing periods.

Example 2

Figure 4:
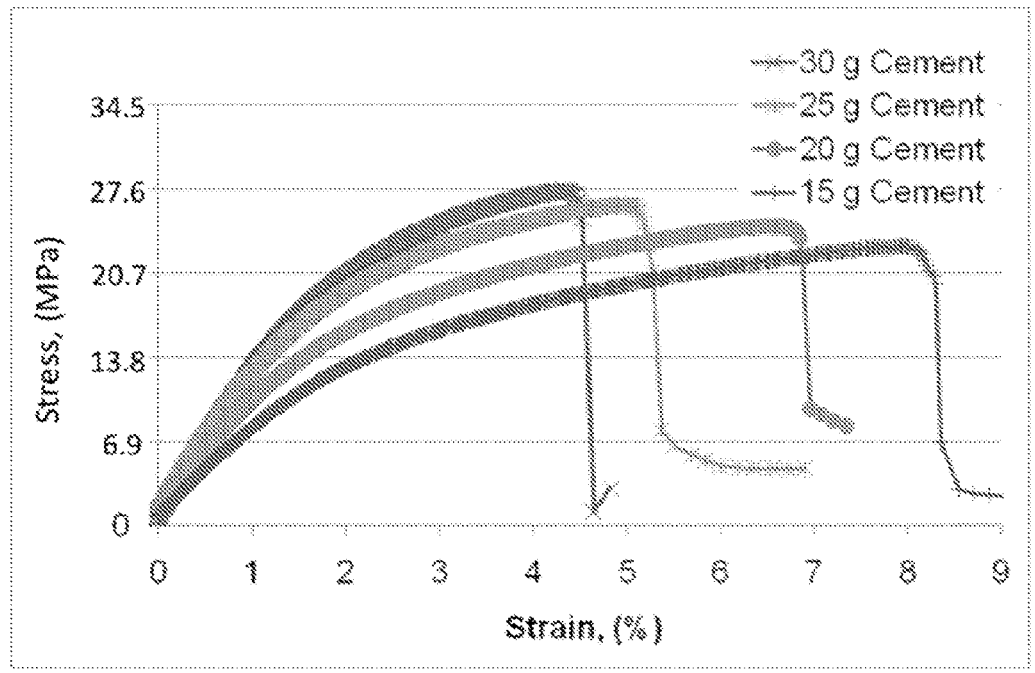
FIG. 4 shows the effect of resin concentration on the ability of a cement system to withstand strain.

Waterborne resin and hardening agent were combined in a 1:1 stoichiometric ratio. The proportions were 43.75 g of EPI-REZ 6006-W-68 and 5.07 g of EPIKURE 3300. Mixtures were allowed to cure for a 1-min time period. After the curing periods, each mixture was added to various amounts of Class G Portland cement to form a slurry—15 g, 20 g, 25 g and 30 g. After setting in the water bath for 24 hours, cylindrical cores were fabricated and underwent mechanical-property measurements. The results, presented in FIG.FIG. 4, show that the strain at failure increased with the amount of resin in the slurry.

Example 3

Figure 5:
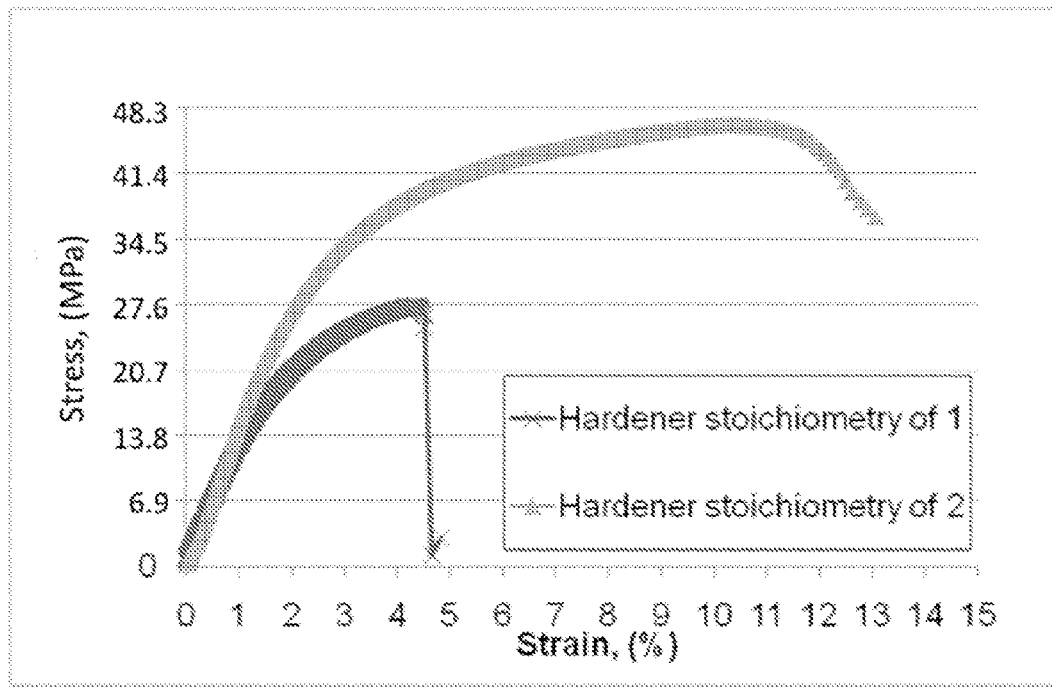
FIG. 5 shows the effect of hardening-agent concentration on the ability of a cement system to withstand strain.

Waterborne resin and hardening agent were combined in a 1:1 and a 1:2 stoichiometric ratio. The mixtures were allowed to cure for a 1-min time period. After the curing periods, each mixture was added to 30 g of Class G Portland cement to form a slurry. After setting in the water bath for 24 hours, cylindrical cores were fabricated and underwent mechanical-property measurements. The results, presented in FIG.FIG. 5, show that the strain at failure increased with the higher concentration of hardener in the slurry.

Example 4

Figure 6:
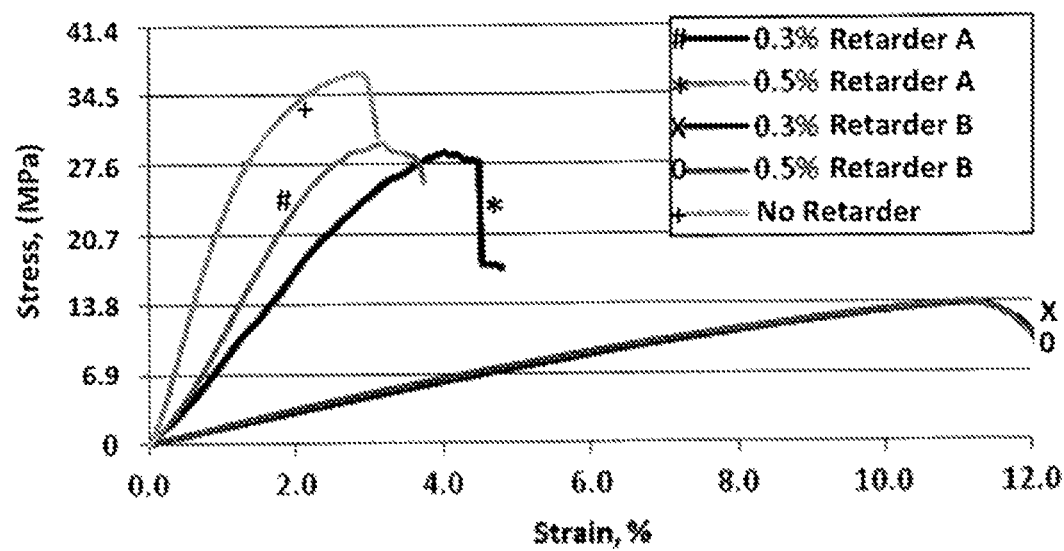
FIG. 6 shows the effect of adding cement retarders on the ability of a cement system to withstand strain.

Waterborne resin and hardening agent were combined in a 1:1 stoichometric ratio. The proportions were 43.75 g of EPI-REZ 6006-W-68 and 5.07 g of EPIKURE 3300. Five mixtures were prepared and allowed to cure for a 1-min time period. After the curing periods, each mixture was added to Portland cement such that the resin content in each slurry was 33 vol %. Two slurries contained sodium lignosulfonate retarder at concentrations of 0.3% and 0.5% by weight of cement. Two slurries contained a retarder consisting of a 50:50 by weight blend of sodium lignosulfonate and sodium gluconate. The retarder concentrations were 0.3% and 0.5% by weight of cement. The fifth slurry was a control with no retarder. After setting in the water bath for 24 hours, cylindrical cores were fabricated and underwent mechanical-property measurements. The results, presented in FIG.FIG. 6, show that the strain at failure increased significantly when the retarders were present in the slurry.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

The invention claimed is:

1. A method for treating a subterranean well, comprising:
 (i) providing a first composition comprising a slurry comprising an inorganic cement and a retarder comprising a lignosulfonate, a hydrocarboxylic acid, or a phosphonate or a combination thereof;
 (ii) providing a second composition comprising a waterborne resin having an initial particle size;
 (iii) adding a hardening agent to the second composition, and allowing the hardening agent to react with the resin;
 (iv) mixing the first composition with the second composition containing the hardening agent; and
 (v) placing the resulting mixture in the well,
 wherein the stoichiometric ratio—hardening agent:resin— is from 0.25:1 to 30:1, and the resin is present in the resulting mixture at a concentration between about 5% and about 95% by volume.

2. The method of claim 1, wherein the resin comprises epoxy resin, novolac resins, polyepoxide resins, phenol-aldehyde resins, urea-aldehyde resins, urethane resins, phenolic resins, furan resins, furan/furfuryl alcohol resins, bismaleimide resins, phenolic/latex resins, phenol formaldehyde resins, unsaturated polyester resins, polyester resins, hybrid polyester resins, polyester copolymer resins, polyurethane resins, hybrid polyurethane resins, polyurethane copolymer resins, acrylate resins, polyacrylic resins, alkyd resins, amino resins, polyimide resins, vinyl ester resins, cyanate esters, silicone resins, or epoxy vinyl resins, or combinations thereof.

3. The method of claim 1, wherein the hardening agent comprises aliphatic amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, naminophenyl piperazine, imidazoline, 1,2-diaminocyclohexane, polytheramine, diethyltoluenediamine, diaminodiphenyl methane, methyltetrahydrophthalic anhydride, hexahydrophthalic anhydride, maleic anhydride, polyazelaic polyanhydride, or phthalic anhydride, or combinations thereof.

4. The method of claim 1, wherein the resin, the hardening agent or both are encapsulated.

5. The method of claim 1, wherein the composition further comprises a particulate material comprising silica, hematite, barite, ilmenite, manganese tetraoxide, bauxite, magnesium oxide, polyethylene, unitaite, rubber, carbon fibers, cellulosic fibers, plastic fibers, glass fibers, metallic fibers, mineral fibers, para-aramid fibers, polyvinyl alcohol fibers, polylactic acid fibers, polyglycolic acid fibers, cured resin coated sand, or curable resin coated sand, or combinations thereof.

6. The method of claim 1, wherein the initial resin particle size is between about 50 nm and 1 mm, and the resin is a solid dispersion, or a liquid dispersion, or a combination thereof.

7. A method for improving zonal isolation in a subterranean well penetrating a wellbore, comprising:
 (i) providing a first composition comprising a slurry comprising an inorganic cement and a retarder comprising a lignosulfonate, a hydrocarboxylic acid, or a phosphonate or a combination thereof;
 (ii) providing a second composition comprising a waterborne resin having an initial particle size;
 (iii) adding a hardening agent to the second composition, and allowing the hardening agent to react with the resin for a time period between about 1 minute and 1 hour;
 (iv) mixing the first composition with the second composition containing the hardening agent; and
 (v) placing the resulting mixture in the well,
 wherein the stoichiometric ratio—hardening agent:resin— is from 0.25:1 to 30:1, and the resin is present in the resulting mixture at a concentration between about 5% and about 95% by volume.

8. The method of claim 7, wherein the resin comprises epoxy resin, novolac resins, polyepoxide resins, phenol-aldehyde resins, urea-aldehyde resins, urethane resins, phenolic resins, furan resins, furan/furfuryl alcohol resins, bismaleimide resins, phenolic/latex resins, phenol formaldehyde resins, unsaturated polyester resins, polyester resins, hybrid polyester resins, polyester copolymer resins, polyurethane resins, hybrid polyurethane resins, polyurethane copolymer resins, acrylate resins, polyacrylic resins, alkyd resins, amino resins, polyimide resins, vinyl ester resins, cyanate esters, silicone resins, or epoxy vinyl resins, or combinations thereof.

9. The method of claim 7, wherein the hardening agent comprises aliphatic amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, naminophenyl piperazine, imidazoline, 1,2-diaminocyclohexane, polytheramine, diethyltoluenediamine, diaminodiphenyl methane, methyltetrahydrophthalic anhydride, hexahydrophthalic anhydride, maleic anhydride, polyazelaic polyanhydride, or phthalic anhydride, or combinations thereof.

10. The method of claim 7, wherein the resin, the hardening agent or both are encapsulated.

11. The method of claim 7, wherein the composition further comprises a particulate material comprising silica, hematite, barite, ilmenite, manganese tetraoxide, bauxite, magnesium oxide, polyethylene, unitaite, rubber, carbon fibers, cellulosic fibers, plastic fibers, glass fibers, metallic fibers, mineral fibers, para-aramid fibers, polyvinyl alcohol fibers, polylactic acid fibers, polyglycolic acid fibers, cured resin coated sand, or curable resin coated sand, or combinations thereof.

12. The method of claim 7, wherein the initial resin particle size is between about 50 nm and 1 mm, and the resin is a solid dispersion, or a liquid dispersion, or a combination thereof.

13. A method for consolidating a subterranean formation, comprising:
   (i) providing a first composition comprising a slurry comprising an inorganic cement and a retarder comprising a lignosulfonate, a hydrocarboxylic acid, or a phosphonate or a combination thereof;
   (ii) providing a second composition comprising a waterborne resin having an initial particle size;
   (iii) adding a hardening agent to the second composition, and allowing the hardening agent to react with the resin for a time period between about 1 minute and 1 hour;
   (iv) mixing the first composition with the second composition containing the hardening agent; and
   (v) injecting the resulting mixture in the formation,
   wherein the stoichiometric ratio—hardening agent:resin—is from 0.25:1 to 30:1, and the resin is present in the resulting mixture at a concentration between about 5% and about 95% by volume.

14. The method of claim 13, wherein the resin comprises epoxy resin, novolac resins, polyepoxide resins, phenol-aldehyde resins, urea-aldehyde resins, urethane resins, phenolic resins, furan resins, furan/furfuryl alcohol resins, bismaleimide resins, phenolic/latex resins, phenol formaldehyde resins, unsaturated polyester resins, polyester resins, hybrid polyester resins, polyester copolymer resins, polyurethane resins, hybrid polyurethane resins, polyurethane copolymer resins, acrylate resins, polyacrylic resins, alkyd resins, amino resins, polyimide resins, vinyl ester resins, cyanate esters, silicone resins, or epoxy vinyl resins, or combinations thereof.

15. The method of claim 13, wherein the hardening agent comprises aliphatic amines, aromatic amines, cycloaliphatic amines, heterocyclic amines, amido amines, polyamides, polyethyl amines, polyether amines, polyoxyalkylene amines, carboxylic anhydrides, triethylenetetraamine, ethylene diamine, N-cocoalkyltrimethylene, isophorone diamine, naminophenyl piperazine, imidazoline, 1,2-diaminocyclohexane, polytheramine, diethyltoluenediamine, diaminodiphenyl methane, methyltetrahydrophthalic anhydride, hexahydrophthalic anhydride, maleic anhydride, polyazelaic polyanhydride, or phthalic anhydride, or combinations thereof.

16. The method of claim 13, wherein the composition further comprises a particulate material comprising silica, hematite, barite, ilmenite, manganese tetraoxide, bauxite, magnesium oxide, polyethylene, unitaite, rubber, carbon fibers, cellulosic fibers, plastic fibers, glass fibers, metallic fibers, mineral fibers, para-aramid fibers, polyvinyl alcohol fibers, polylactic acid fibers, polyglycolic acid fibers, cured resin coated sand, or curable resin coated sand, or combinations thereof.

17. The method of claim 13, wherein the initial resin particle size is between about 50 nm and 1 mm, and the resin is a solid dispersion, or a liquid dispersion, or a combination thereof.

* * * * *